(12) United States Patent
Huang-Fu et al.

(10) Patent No.: US 11,026,275 B2
(45) Date of Patent: Jun. 1, 2021

(54) HANDLING OF COLLISION BETWEEN PDU SESSION ESTABLISHMENT AND RELEASE PROCEDURES

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Yu-Chieh Tien, Hsin-Chu (TW)

(73) Assignee: MEDIATEK INC., Hsin-Chu (TW)

(*) Notice: Subject to any disclaimer, the term of this patent is extended or adjusted under 35 U.S.C. 154(b) by 69 days.

(21) Appl. No.: 16/593,030

(22) Filed: Oct. 4, 2019

(65) Prior Publication Data
US 2020/0113004 A1 Apr. 9, 2020

Related U.S. Application Data

(60) Provisional application No. 62/742,325, filed on Oct. 6, 2018.

(51) Int. Cl.
*H04W 76/11* (2018.01)
*H04W 76/36* (2018.01)
*H04W 76/10* (2018.01)
*H04W 76/18* (2018.01)
*H04W 76/30* (2018.01)
(Continued)

(52) U.S. Cl.
CPC ............ *H04W 76/11* (2018.02); *H04W 8/30* (2013.01); *H04W 12/06* (2013.01); *H04W 28/04* (2013.01); *H04W 76/10* (2018.02); *H04W 76/18* (2018.02); *H04W 76/30* (2018.02); *H04W 76/36* (2018.02);
(Continued)

(58) Field of Classification Search
None
See application file for complete search history.

(56) References Cited

U.S. PATENT DOCUMENTS

| 2019/0098536 A1* | 3/2019 | Qiao | H04W 36/0016 |
| 2019/0098537 A1* | 3/2019 | Qiao | H04W 36/0033 |
| 2020/0113014 A1* | 4/2020 | Huang-Fu | H04W 28/04 |

FOREIGN PATENT DOCUMENTS

| CN | 101030964 A | 9/2007 |
| WO | WO2009092235 A1 | 7/2009 |

OTHER PUBLICATIONS

International Search Report and Written Opinion of International Search Authority for PCT/CN2019/109929 dated Dec. 27, 2019 (10 pages).

(Continued)

*Primary Examiner* — Andrew C Oh
(74) *Attorney, Agent, or Firm* — Imperium Patent Works; Zheng Jin

(57) ABSTRACT

A method of handling collision between PDU session establishment and PDU session release procedures is proposed. At UE side, a UE first initiates a PDU session establishment procedure to establish a PDU session having a PDU session ID. If UE receives a PDU session release command message on the same PSI, UE should ignore the PDU session release command message, and proceed with the PDU session establishment procedure. At NW side, a network entity initiates a PDU session release procedure to release a PDU session having a PDU session ID. If the network entity receives a PDU session establishment request message from UE on the same PDU session ID, the network entity should locally release the PDU session and proceed with the PDU session establishment procedure.

15 Claims, 6 Drawing Sheets

(51) Int. Cl.
 *H04W 8/30* (2009.01)
 *H04W 28/04* (2009.01)
 *H04W 80/02* (2009.01)
 *H04W 12/06* (2021.01)
 *H04W 80/10* (2009.01)
 *H04W 80/12* (2009.01)

(52) U.S. Cl.
 CPC ........... *H04W 80/02* (2013.01); *H04W 80/10* (2013.01); *H04W 80/12* (2013.01)

(56) References Cited

OTHER PUBLICATIONS

C1-186480 3GPP TSG-CT WG1 Meeting #112bis, MediaTek Inc., "Handling on collision of PDU session establishment and release procedures", Vilnius (Lithuania), Oct. 15-19, 2018 (3 pages) *section 6.4.1.6*.
C1-186658 3GPP TSG-CT WG1 Meeting #112bis, MediaTek Inc., "Handling on collision of PDU session establishment and release procedure", Vilnius (Lithuania), Oct. 15-19, 2018 (2 pages) *section 6.4.1.6*.
C1-184421 3GPP TSG-CT WG1 Meeting #111 bis, Mediatek Inc et al., "PDU session release in Active Pending State", Sophia-Antipolis (France), Jul. 9-13, 2018 (3 pages) *section 6.4.3.6*.

* cited by examiner

HANDLING OF COLLISION BETWEEN PDU SESSION ESTABLISHMENT AND RELEASE PROCEDURES

CROSS REFERENCE TO RELATED APPLICATIONS

This application claims priority under 35 U.S.C. § 119 from U.S. Provisional Application No. 62/742,325, entitled "5G PDU Session Procedure Enhancements", filed on Oct. 6, 2018, the subject matter of which is incorporated herein by reference.

TECHNICAL FIELD

The disclosed embodiments relate generally to wireless communication, and, more particularly, to method of handling collision between PDU session establishment and release procedures in next generation mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. The network/UE can initiate different PDU session procedures, e.g., PDU session establishment, PDU session modification, and PDU session release. Accordingly, for each PDU session, a UE can be in different 5G session management (5GSM) states during the different PDU session procedures. The different PDU session states include PDU session active state, inactive state, active pending state, inactive pending state, and modification pending state.

When UE receives a PDU session release command message from the network, the UE sends a PDU session release complete message back to the network. However, the message may get lost and not received by the network. From the UE perspective, the PDU session has already been released and UE may try to establish a new PDU session, using the same PDU session ID, by sending a PDU session establishment request message to the network. From the network perspective, timer 3592 is started when the PDU session release command message is sent out, and the network will re-transmit another PDU session release command message when timer 3592 expires and no PDU session release complete message has been received. As a result, a collision occurs between the UE initiated PDU session establishment procedure and the network initiated PDU session release procedure. Both UE behavior and network behavior are undefined.

A solution is sought.

SUMMARY

A method of handling collision between PDU session establishment and PDU session release procedures is proposed. At UE side, a UE first initiates a PDU session establishment procedure to establish a PDU session having a PDU session ID. If UE receives a PDU session release command message on the same PSI, UE should ignore the PDU session release command message, and proceed with the PDU session establishment procedure. At NW side, a network entity initiates a PDU session release procedure to release a PDU session having a PDU session ID. If the network entity receives a PDU session establishment request message from UE on the same PDU session ID, the network entity should locally release the PDU session and proceed with the PDU session establishment procedure.

In one embodiment, a UE transmits a protocol data unit (PDU) session establishment request message to a network entity in mobile communication network. The PDU session establishment request message carries a PDU session identity (PSI). The UE receives a PDU session release command message from the network entity after transmitting the PDU session establishment request message. The PDU session release command message carries the same PSI. The UE ignores the PDU session release command message from the network. The UE proceeds with the PDU session establishment procedure.

In another embodiment, a network entity transmits a protocol data unit (PDU) session release command message to a user equipment (UE) in mobile communication network. The PDU session release command message carries a PDU session identity (PSI) of an old PDU session to be released. The network entity receives a PDU session establishment request message from the UE. The PDU session establishment request message carries the same PSI of a new PDU session to be established. The network entity proceeds with the PDU session establishment procedure for the new PDU session. The network entity locally releases the old PDU session without receiving a PDU session release complete message from the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
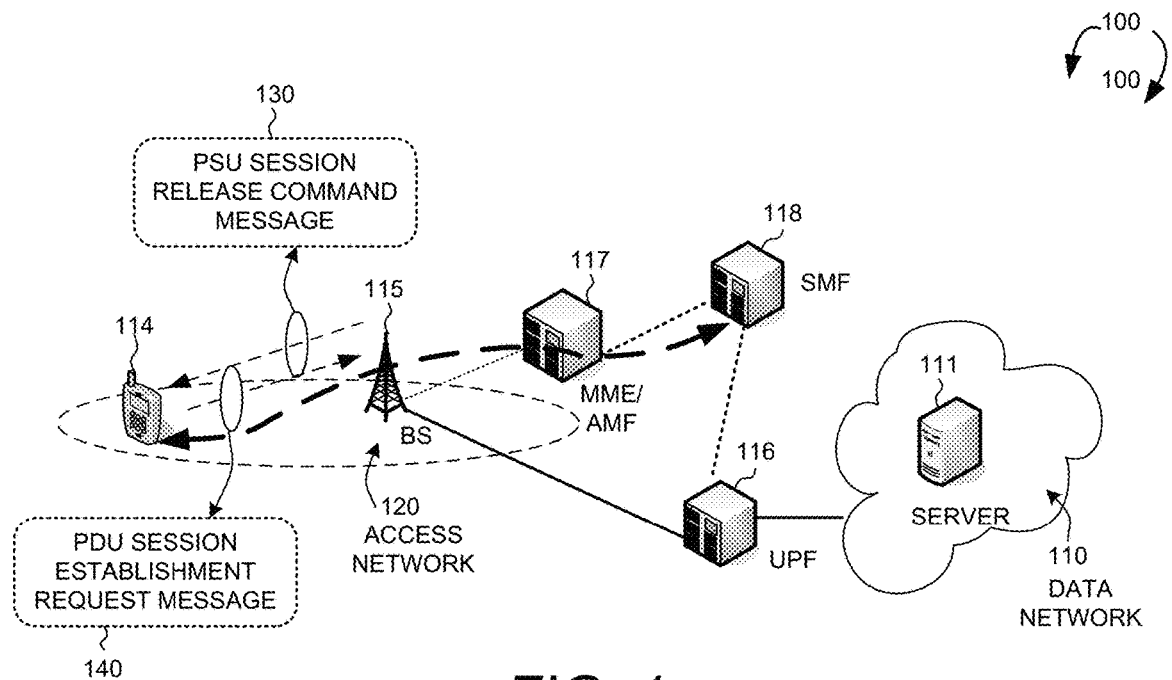
FIG. 1 illustrates an exemplary 5G new radio (NR) network supporting the handling of collision between PDU session establishment and PDU session release procedures in accordance with one novel aspect.

FIG. 1 illustrates an exemplary 5G new radio (NR) network 100 supporting the handling of collision between PDU session establishment and PDU session release procedures in accordance with one novel aspect. LTE/NR network 100 comprises data network 110 and application server 111 that provides various services by communicating with a plurality of user equipments (UEs) including UE 114. In the example of FIG. 1, UE 114 and its serving base station BS 115 belong to part of a radio access network RAN 120. RAN 120 provides radio access for UE 114 via a radio access technology (RAT). Application server 111 communicates with UE 114 through User Plane Function (UPF) 116 and BS 115. A mobility management entity (MME) or an access and mobility management function (AMF) 117 communicates with BS 115 for access and mobility management of wireless access devices in LTE/NR network 100. A Session Management Function (SMF) 118 is primarily responsible for interacting with the decoupled data plane, creating, updating and removing Protocol Data Unit (PDU) sessions and managing session context with UPF 116. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

In 5G/NR, a Protocol Data Unit (PDU) session defines the association between the UE and the data network that provides a PDU connectivity service. Each PDU session is identified by a PDU session identity (PSI), and may include multiple QoS flows and QoS rules. The network or the UE can initiate different PDU session procedures, e.g., PDU session establishment, PDU session modification, and PDU session release procedures. When UE receives a PDU session release command message from the network, the UE sends a PDU session release complete message back to the network. However, the message may get lost and not received by the network. From the UE perspective, the PDU session has already been released and UE may try to establish a new PDU session, using the same PDU session ID, by sending a PDU session establishment request message to the network. From the network perspective, timer 3592 is started when the PDU session release command message is sent out, and the network will re-transmit another PDU session release command message when timer 3592 expires and no PDU session release complete message has been received. As a result, a collision occurs between the UE initiated PDU session establishment procedure and the network initiated PDU session release procedure. Both UE behavior and network behavior are undefined.

In accordance with one novel aspect, At UE side, UE 114 first initiates a PDU session establishment procedure by sending a PDU session establishment request message 140 to base station 115. The to be established PDU session has a PDU session ID. If UE 114 later receives a PDU session release command message 130 on the same PDU session ID from base station 115, then UE 114 should ignore the PDU session release command message, and UE 114 should proceed with the PDU session establishment procedure. At NW side, base station 115 initiates a PDU session release procedure by sending a PDU session release command message 130 to UE 114. The to be release PDU session has a PDU session ID. If base station 115 receives a PDU session establishment request message from UE 114 on the same PDU session ID, base station 115 should locally release the old PDU session (without receiving a PDU session release complete message from the UE) and proceed with the PDU session establishment procedure on the new PDU session having the same PDU session ID.

Figure 2:
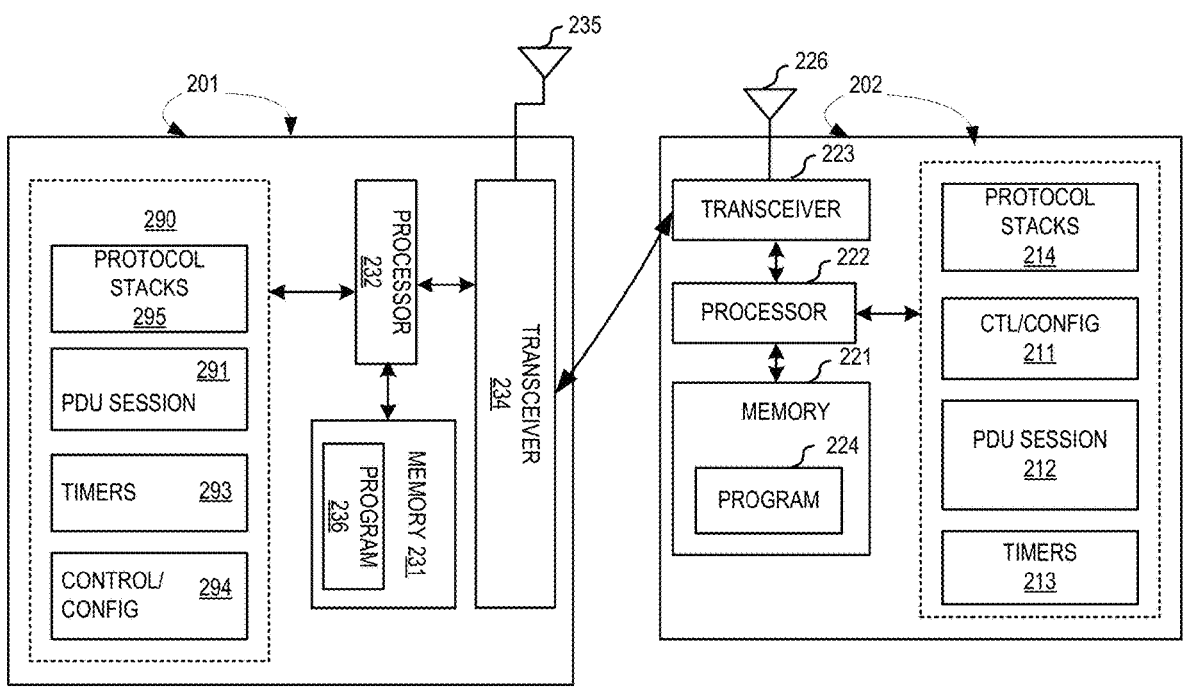
FIG. 2 illustrates simplified block diagrams of a user equipment (UE) and a base station (BS) in accordance with embodiments of the current invention.

FIG. 2 illustrates simplified block diagrams of a user equipment UE 201 and a base station BS 202 in accordance with embodiments of the current invention. BS 202 may have an antenna 226, which may transmit and receive radio signals. RF transceiver module 223, coupled with the antenna, may receive RF signals from antenna 226, convert them to baseband signals and send them to processor 222. RF transceiver 223 may also convert received baseband signals from processor 222, convert them to RF signals, and send out to antenna 226. Processor 222 may process the received baseband signals and invoke different functional modules to perform features in BS/AP 202. Memory 221 may store program instructions and data 224 to control the operations of BS 202. BS 202 may also include a set of functional modules and control circuits, such as a control and configuration circuit 211 for providing control and configuration parameters to UE, a PDU session handling circuit 212 for performing different PDU session procedures with UE, and timer(s) 213 for managing timer(s) related to the PDU session procedures.

Similarly, UE 201 has an antenna 235, which may transmit and receive radio signals. RF transceiver module 234, coupled with the antenna, may receive RF signals from antenna 235, convert them to baseband signals and send them to processor 232. RF transceiver 234 may also convert received baseband signals from processor 232, convert them to RF signals, and send out to antenna 235. Processor 232 may process the received baseband signals and invoke different functional modules to perform features in the UE 201. Memory 231 may store program instructions and data 236 to control the operations of the UE 201. UE 201 may also include a set of function modules and control circuits 290 that may carry out functional tasks of the present invention. Protocol stacks 295 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. A PDU session handing circuit 291 performs various PDU session procedures with serving base station, timer(s) 293 manages various timers for the PDU session procedures, and a control and configuration circuit 294 performs control and manages configuration parameters for the UE.

The various function modules and control circuits may be implemented and configured by software, firmware, hardware, and combination thereof. The function modules and circuits, when executed by the processors via program instructions contained in the memory, interwork with each other to allow the base station and UE to perform embodiments and functional tasks and features in the network. Each module or circuit may comprise a processor (e.g., 222 or 232) together with corresponding program instructions. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201 and BS 202.

Figure 3:
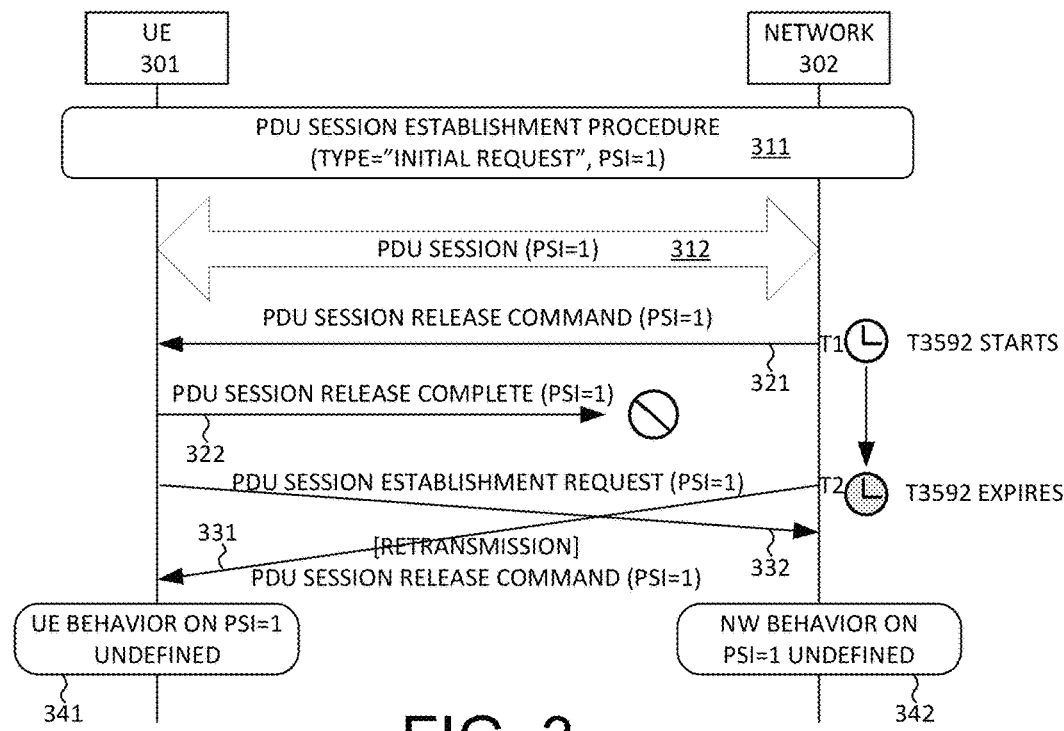
FIG. 3 illustrates a collision issue between a UE initiated PDU session establishment procedure and a network initiated PDU session release procedure.

FIG. 3 illustrates a collision issue between a UE initiated PDU session establishment procedure and a network initiated PDU session release procedure. In step 311, UE 301 and network 302 perform a PDU session establishment procedure, for example, UE 301 sends a PDU session establishment request message (Type=INITIAL REQUEST, PSI=1) to network 302 and in response receives a PDU session establishment accept message. Note that network 302 refers to any network entity including a base station, an AMF, or an SMF. In step 312, UE 301 and network 302 communicate with each other over the established PDU session (PSI=1). In step 321, network 302 decides to release the PDU session by sending a PDU session release command message to UE 301. Network 302 also starts a timer T3592 upon sending the command message at time T1. In step 322, UE 301 releases the PDU session (PSI=1) and sends a PDU session release complete message to network 302. However, the complete message did not reach network 302. Timer T3592 expires later at time T2 and network 302 retransmits another PDU session release command message to UE 301 in step 331. Meanwhile, UE decides to establish another PDU session and sends a PDU session establishment request message with the same PSI=1 to network 302 in step 332. At this point, a collision has occurred between the UE-initiated PDU session establishment procedure and a NW-initiated PDU session release procedure. UE behavior (step 341) and NW behavior (step 342) are undefined as to which PDU session procedure to proceed and which PDU session procedure to ignore.

Figure 4:
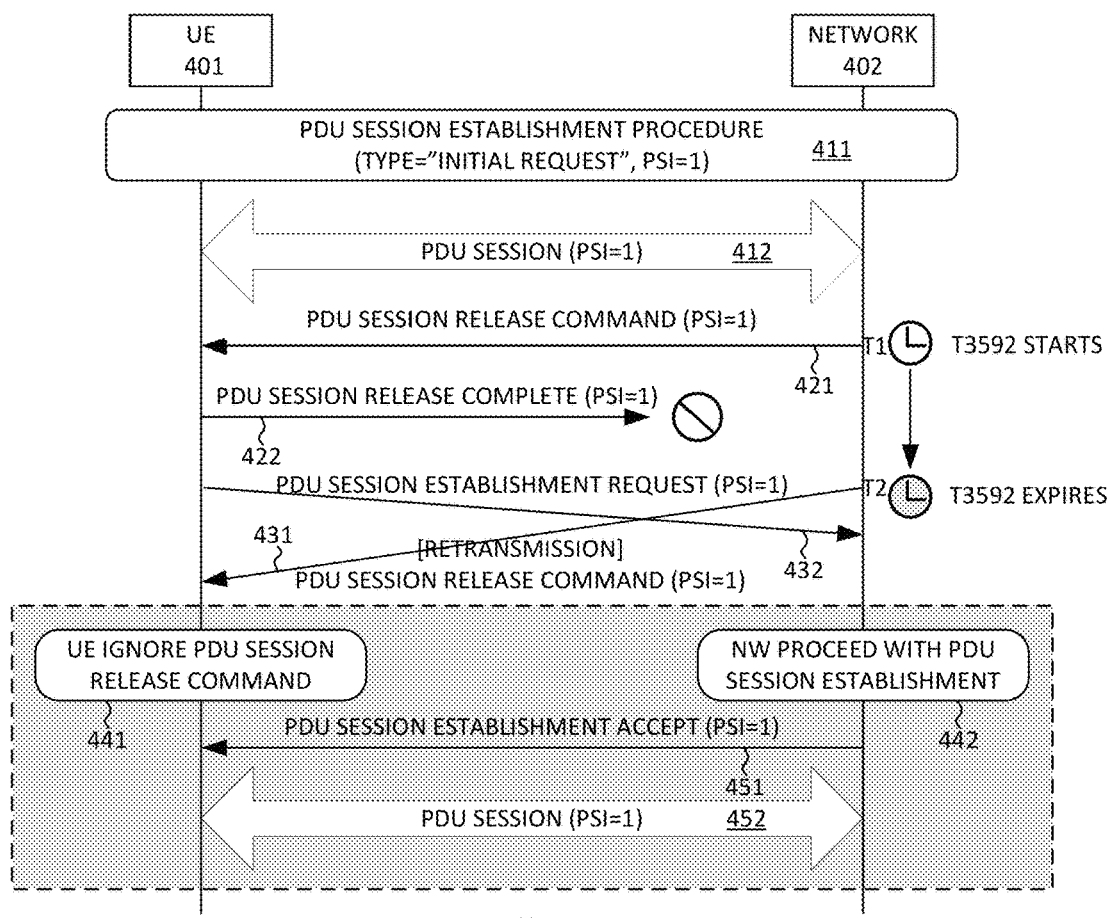
FIG. 4 illustrates a sequence flow between a UE and a network for handling collision between a UE initiated PDU session establishment procedure and a network initiated PDU session release procedure in accordance with embodiments of the current invention.

FIG. 4 illustrates a sequence flow between a UE and a network for handling collision between a UE-initiated PDU session establishment procedure and a NW-initiated PDU session release procedure in accordance with embodiments of the current invention. Steps 411 to 432 are the same as steps 311 to 332 of FIG. 3, which illustrate that a collision has occurred between the UE-initiated PDU session establishment procedure and a NW-initiated PDU session release procedure. In accordance with one novel aspect, both UE and network proceed with the PDU session establishment procedure. In step 441, UE 401 ignores the PDU session release command message. In step 442, network 402 locally releases the old PDU session and proceeds with the PDU session establishment procedure. In step 451, network 402 sends a PDU session establishment accept message with PSI=1 to UE 401. In step 452, UW 401 and network 402 communicate with each other over the newly established PDU session with PSI=1. Note that network 402 refers to any network entity including a base station, an AMF, or an SMF.

Figure 5:
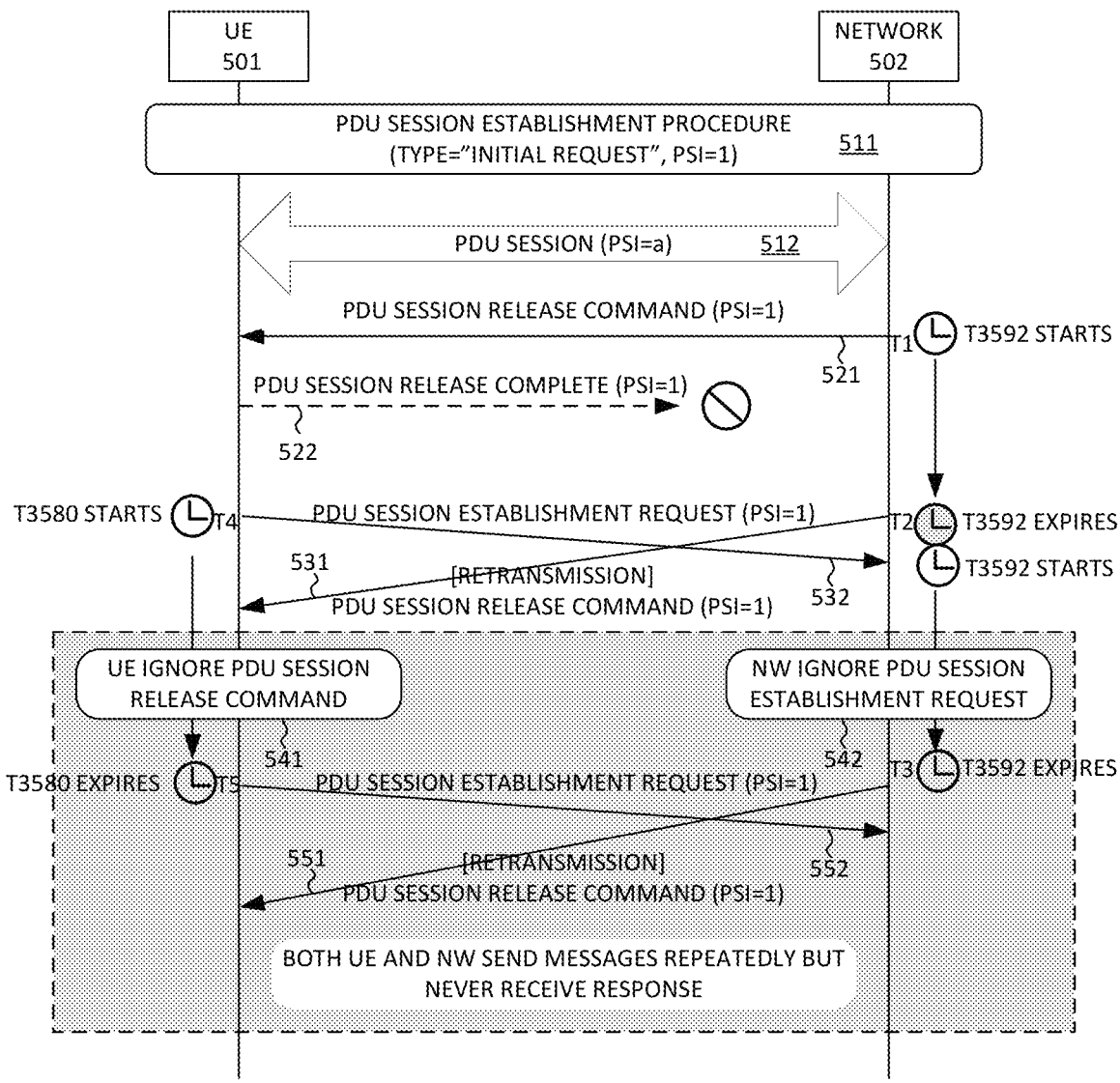
FIG. 5 illustrates a first embodiment of handling collision between PDU session establishment and PDU session release procedures.

FIG. 5 illustrates a first embodiment of handling collision between PDU session establishment and PDU session release procedures. Steps 511 to 532 are the same as steps 411 to 432 of FIG. 4, which illustrate that a collision has occurred between the UE-initiated PDU session establishment procedure and a NW-initiated PDU session release procedure. In the embodiment of FIG. 5, UE 501 proceeds with PDU session establishment but network 502 proceeds with PDU session release. At UE side, UE 501 ignores the PDU session release command message (step 541). In addition, UE 501 starts a timer T3580 when it sends out the PDU session establishment request message at time T4, and retransmits the PDU session establishment request message when timer T3580 expires at time T5. At NW side, network 502 ignores the PDU session establishment request message (step 542). In addition, network 502 restarts timer T3592 when it sends out the PDU session release command message at time T2, and retransmits the PDU session release command message when timer T3592 expires at time T3. As a result, both UE and NW send messages repeatedly but never receive response.

Figure 6:
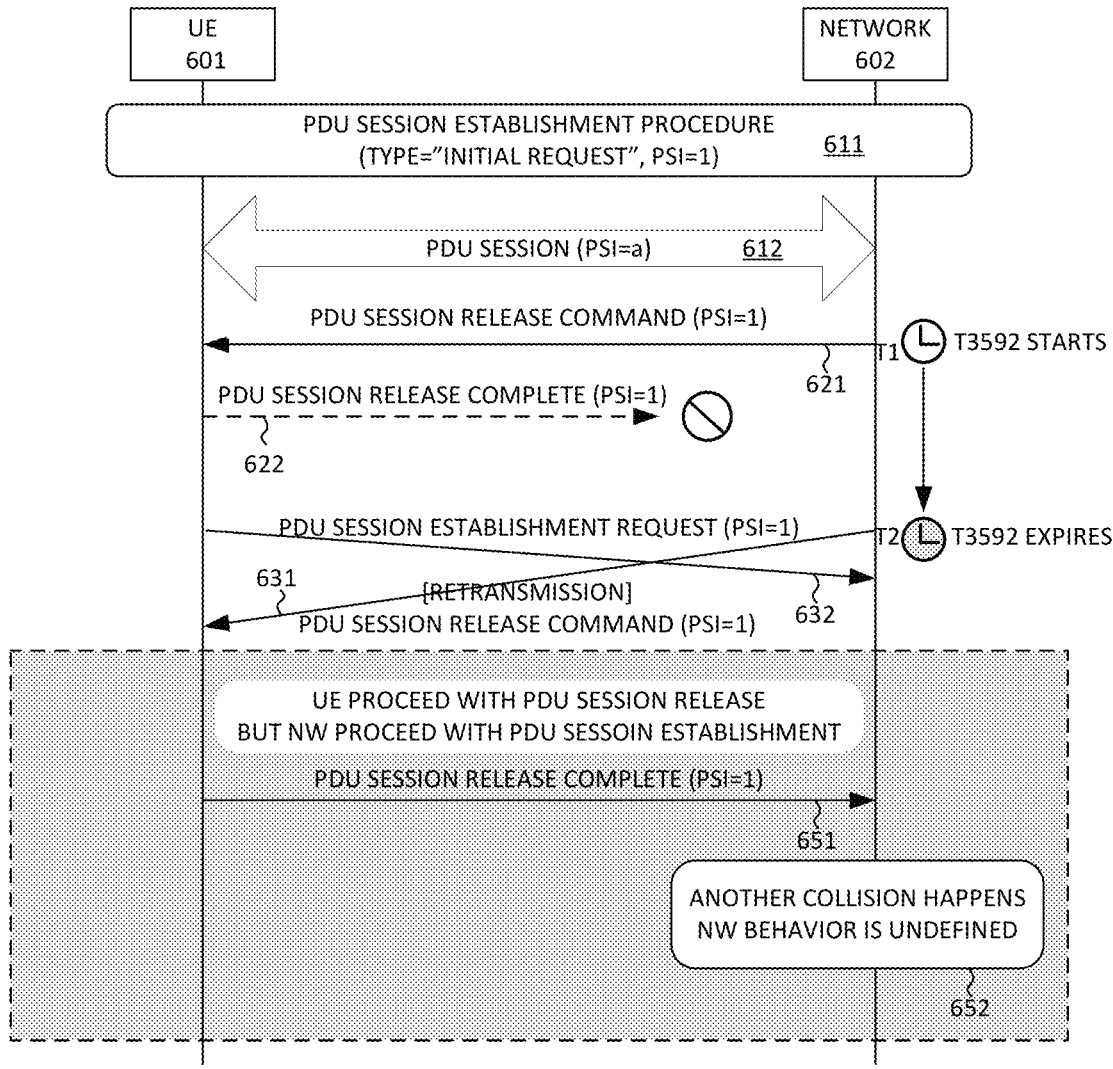
FIG. 6 illustrates a second embodiment of handling collision between PDU session establishment and PDU session release procedures.

FIG. 6 illustrates a second embodiment of handling collision between PDU session establishment and PDU session release procedures. Steps 611 to 632 are the same as steps 411 to 432 of FIG. 4, which illustrate that a collision has occurred between the UE-initiated PDU session establishment procedure and a NW-initiated PDU session release procedure. In the embodiment of FIG. 6, UE 601 proceeds with PDU session release but network 602 proceeds with PDU session establishment. In step 651, UE sends a PDU session release complete message to network 602 to release the old PDU session having PSU=1. In step 652, network 602 detects another collision between the PDU session establishment procedure and the PDU session release procedure and its behavior is undefined.

Figure 7:
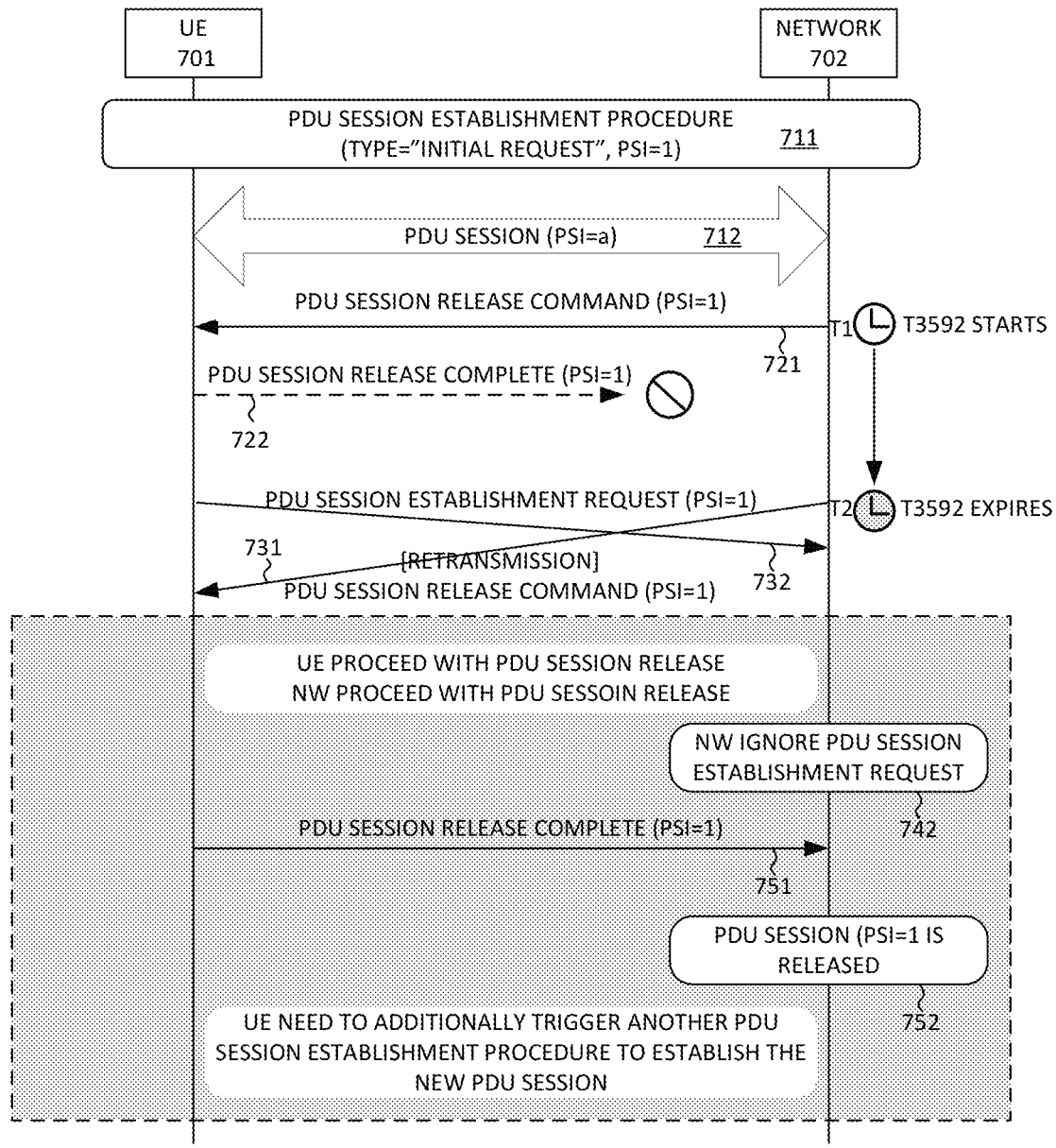
FIG. 7 illustrates a third embodiment of handling collision between PDU session establishment and PDU session release procedures.

FIG. 7 illustrates a third embodiment of handling collision between PDU session establishment and PDU session release procedures. Steps 711 to 732 are the same as steps 411 to 432 of FIG. 4, which illustrate that a collision has occurred between the UE-initiated PDU session establishment procedure and a NW-initiated PDU session release procedure. In the embodiment of FIG. 7, both UE and NW proceed with PDU session release. In step 742, network 702 ignores the PDU session establishment request message. In step 751, UE 701 sends a PDU session release complete message to release the old PDU session with PSI=1. In step 752, network 702 releases the old PDU session with PSI=1. As a result, UE 701 needs to additionally trigger another PDU session establishment procedure to establish the new PDU session.

Figure 8:
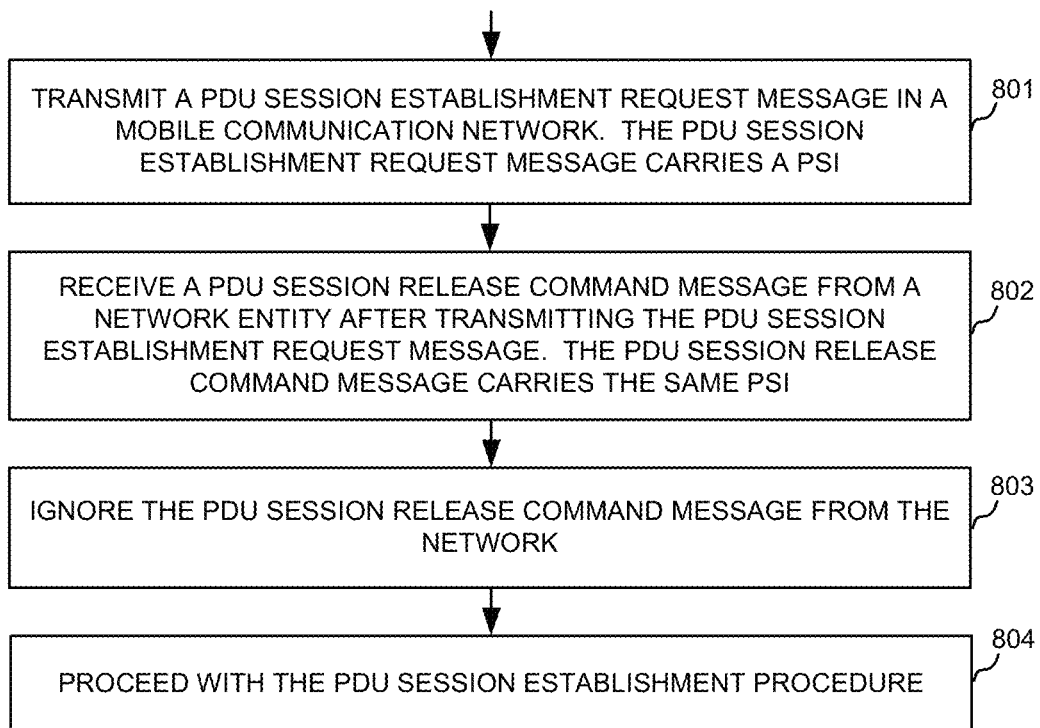
FIG. 8 is a flow chart of a method of handling collision between PDU session establishment and PDU session release procedures in accordance with a novel aspect.

FIG. 8 is a flow chart of a method of handling collision between PDU session establishment and PDU session release procedures from UE perspective in accordance with a novel aspect. In step 801, a UE transmits a protocol data unit (PDU) session establishment request message in mobile communication network. The PDU session establishment request message carries a PDU session identity (PSI). In step 802, the UE receives a PDU session release command message from a network entity after transmitting the PDU session establishment request message. The PDU session release command message carries the same PSI. In step 803, the UE ignores the PDU session release command message from the network. In step 804, the UE proceeds with the PDU session establishment procedure.

Figure 9:
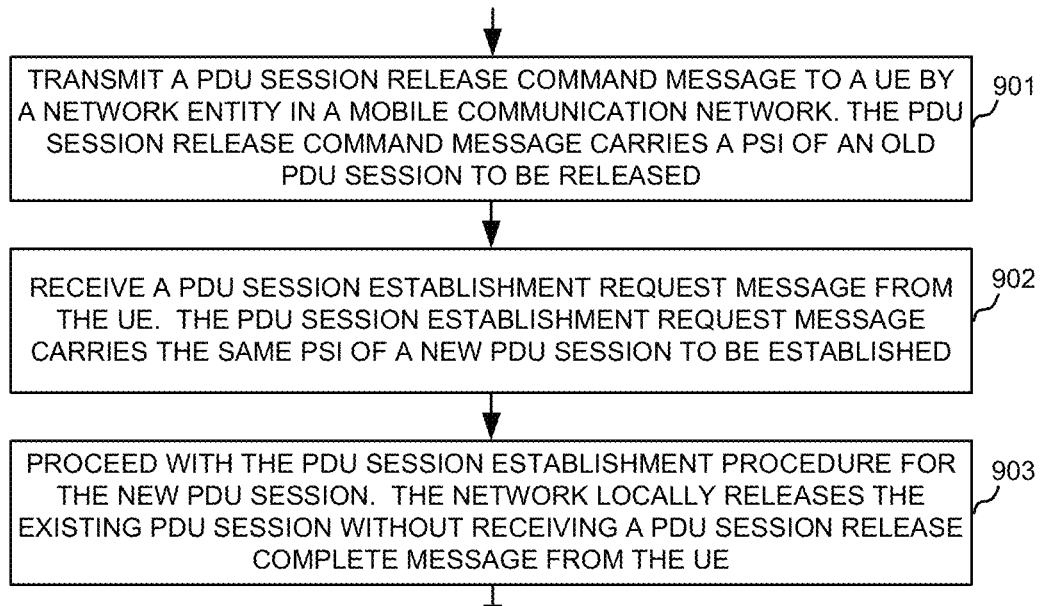
FIG. 9 is a flow chart of a method of handling collision between PDU session establishment and PDU session release procedures from NW perspective in accordance with a novel aspect.

FIG. 9 is a flow chart of a method of handling collision between PDU session establishment and PDU session release procedures from NW perspective in accordance with a novel aspect. In step 901, a network entity transmits a protocol data unit (PDU) session release command message to a user equipment (UE) in mobile communication network. The PDU session release command message carries a PDU session identity (PSI) of an old PDU session to be released. In step 902, the network entity receives a PDU session establishment request message from the UE. The PDU session establishment request message carries the same PSI of a new PDU session to be established. In step 903, the network entity proceeds with the PDU session establishment procedure for the new PDU session. The network entity locally releases the old PDU session without receiving a PDU session release complete message from the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
transmitting a protocol data unit (PDU) session establishment request message by a user equipment (UE) in a mobile communication network, wherein the PDU session establishment request message carries a PDU session identity (PSI);
receiving a PDU session release command message from a network entity after transmitting the PDU session establishment request message, wherein the PDU session release command message carries the same PSI;
ignoring the PDU session release command message from the network; and
proceeding with the PDU session establishment procedure.

2. The method of claim 1, further comprising:
receiving a previous PDU session release command message to release an old PDU session having the same PSI before transmitting the PDU session establishment request message.

3. The method of claim 2, wherein the UE transmits a PDU session release complete message to the network to release the old PDU session.

4. The method of claim 3, wherein the PDU session release complete message is lost in the network and not received by the network entity.

5. The method of claim 1, further comprising:
receiving a PDU session establishment accept message from the network and establishing the PDU session having the same PSI.

6. A User Equipment (UE), comprising:
a transmitter that transmits a protocol data unit (PDU) session establishment request message in a mobile communication network, wherein the PDU session establishment request message carries a PDU session identity (PSI);
a receiver that receives a PDU session release command message from a network entity after transmitting the PDU session establishment request message, wherein the PDU session release command message carries the same PSI; and
a PDU session handling circuit that ignores the PDU session release command message from the network, and proceeds with the PDU session establishment procedure.

7. The UE of claim 6, wherein the UE receives a previous PDU session release command message to release an old PDU session having the same PSI before transmitting the PDU session establishment request message.

8. The UE of claim 7, wherein the UE transmits a PDU session release complete message to the network to release the old PDU session.

9. The UE of claim 8, wherein the PDU session release complete message is lost in the network and not received by the network entity.

10. The UE of claim 6, wherein the UE receives a PDU session establishment accept message from the network and establishing the PDU session having the same PSI.

11. A method, comprising:
transmitting a protocol data unit (PDU) session release command message to a user equipment (UE) by a network entity in a mobile communication network, wherein the PDU session release command message carries a PDU session identity (PSI) of an existing PDU session to be released;
receiving a PDU session establishment request message from the UE, wherein the PDU session establishment request command message carries the same PSI of a new PDU session to be established; and
proceeding with the PDU session establishment procedure for the new PDU session, wherein the network locally releases the existing PDU session without receiving a PDU session release complete message from the UE.

12. The method of claim 11, wherein the PDU session release complete message is transmitted from the UE but not received by the network entity.

13. The method of claim 11, further comprising:
starting a timer upon transmitting the PDU session release command message; and
retransmitting the PDU session release command message upon the timer expiry before receiving the PDU session establishment request message.

14. The method of claim 13, wherein the network entity does not retransmit the PDU session release command message upon the timer expiry after receiving the PDU session establishment request message.

15. The method of claim 11, further comprising:
transmitting a PDU session establishment accept message to the UE and establishing the new PDU session having the same PSI.

* * * * *